May 23, 1950 — H. A. BROOS — 2,508,936

REFLEX AMPLIFIER CIRCUIT ARRANGEMENT

Filed April 12, 1946

HENRICUS ADRIANUS BROOS.
INVENTOR.

BY [signature]

ATTORNEY.

Patented May 23, 1950 2,508,936

UNITED STATES PATENT OFFICE 2,508,936

REFLEX AMPLIFIER CIRCUIT ARRANGEMENT

Henricus Adrianus Broos, Eindhoven, Netherlands, assignor, by mesne assignments, to Hartford National Bank and Trust Company, Hartford, Conn., as trustee Application April 12, 1946, Serial No. 661,519
In the Netherlands March 3, 1943

Section 1, Public Law 690, August 8, 1946
Patent expires March 3, 1963

10 Claims. (Cl. 179—171)

Figure 1:
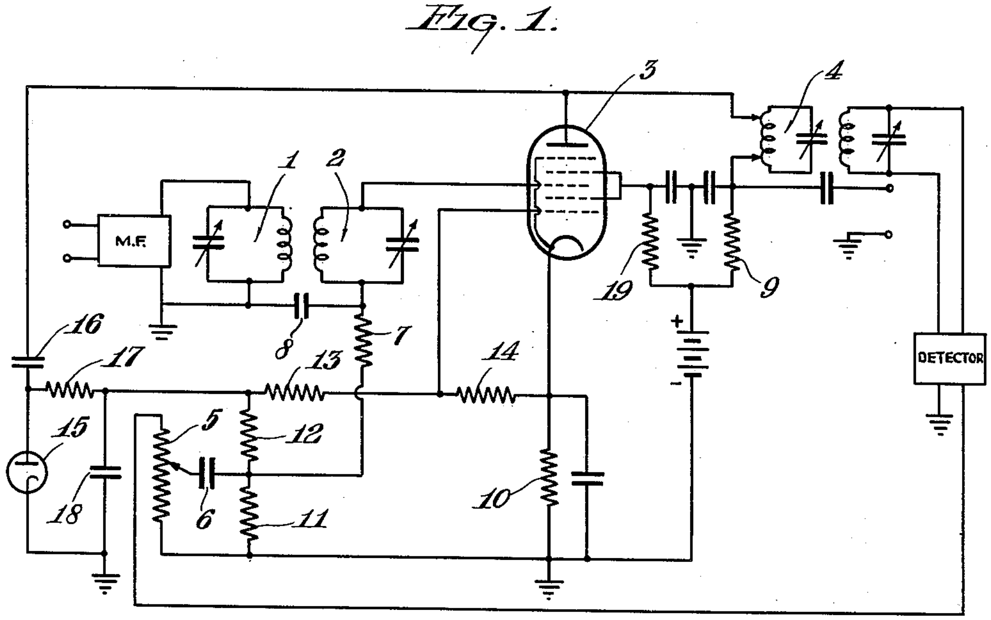

This invention relates to a circuit arrangement for controllable and distortion-free amplification of electrical oscillations and more particularly of oscillations forming part of two or more different frequency bands, by means of a discharge tube comprising at least two control grids and one or more screen-grids placed between these grids.

In circuits for amplifying electrical oscillations forming part of two or more different frequency bands (so-called reflex circuits) the amplification control involves difficulties, since a linear characteristic curve is necessary for avoiding interaction of the various frequency bands, whereas a curved characteristic is required for amplification control.

The present invention, however, provides a circuit which permits the obtainment of a controllable and at the same time distortion-free circuit and more particularly permits the amplification with reflex circuits to be controlled without interaction of the various oscillations. The invention is based inter alia on the realization that by controlling two different control grids of a discharge tube it is possible to obtain a system of linear or substantially linear characteristic curves having differing slopes. Every value of the control voltage is then associated with a substantially linear characteristic curve having a definite slope; by modification of the control voltage adjustment takes place in any instance to a characteristic curve having a different slope—either greater or smaller—as a result of which the amplification of the circuit is increased and decreased repectively.

According to the invention the oscillations are supplied to the second control grid (reckoned from the cathode onwards) of the discharge tube and the control voltage is led both to the first and to the second control-grid of this tube, a resistance being inserted in the screen-grid circuit.

The control voltage is preferably supplied in such a ratio to the first and second control grid that in the case of adjustment the working point of the circuit shifts about over the middles of the characteristic curves indicating the relation existing between the direct anode current and the direct voltage of the second control grid with different values of the direct voltage of the first control grid. The manner in which the circuit parameters are derived and the operation of the circuit will be described later in connection with the description of the several embodiments of the invention.

Good results are obtained when making use of a hexode or a heptode having interconnected screen-grids.

With reflex circuits, for which the invention is of particular importance, the second control grid of the discharge tube is supplied both with intermediate-frequency oscillations and with the low-frequency oscillations derived therefrom after amplication and detection.

In the case of a very strong amplification being required the oscillations may first be supplied to the first control grid for the purpose of preliminary amplification. In this case the preliminarily amplified oscillations appearing in the screen-grid circuit are transmitted to the second control grid through an impedance.

The control of the preliminary amplification takes effectually place by negative backcoupling from the screen grid to the first control grid.

With reflex circuits, in which both intermediate frequency oscillations and the low-frequency oscillations derived therefrom after amplification and detection are amplified simultaneously, it is advisable that solely the low frequency oscillations should be preliminarily amplified in the manner referred to above, if required whilst making use of negative backcoupling.

Sometimes it is desired to provide an impedance between the first control grid and the screen-grid, which impedance is so proportioned as to avoid entirely or almost entirely amplification of any appearing screen-grid alternating voltages. Such a circuit is of importance, for instance, for the suppression of humming voltages set up at the screen grid.

In order that the invention may be clearly understood and readily carried into effect it will now be described more fully with reference to the accompanying drawing, given by way of example.

Fig. 1 represents diagrammatically a reflex circuit in which intermediate frequency oscillations and the low frequency oscillations derived therefrom after amplification and detection are amplified simultaneously. The intermediate frequency oscillations are supplied to the terminals marked MF in the figure, and low frequency oscillations to the terminals marked LF.

The intermediate frequency oscillations are led to the second control grid of a heptode 3 through the intermediary of an intermediate frequency band-pass filter consisting of two circuits 1 and 2. The amplified oscillations may be taken from an intermediate frequency circuit 4 included in the anode circuit of the discharge tube and, after having been once more amplified if required, be detected. The last-mentioned expedients are not illustrated in the drawing. After that the low frequency oscillations obtained after detection are supplied to the terminals LF. Between these terminals is provided a potentiometer 5 from which the low frequency voltage to be amplified can be taken; through the intermediary of a condenser 6 and a resistance 7 this voltage is also led to the second control grid. Amplification of any intermediate frequency oscillations appearing between the terminals LF is prevented by a filter consisting of resistance 7 and a condenser 8, thus avoiding instability of the circuit. The amplified low frequency oscillations are taken from a resistance 9 inserted in the anode circuit of the heptode 3 and transmitted to a low frequency amplifier.

The direct current flowing through a resistance 10 in the cathode lead of the tube supplies the fixed negative biases for the two control grids through the intermediary of a potentiometer circuit consisting of resistances 11, 12, 13 and 14, the first control grid being connected between the resistances 13 and 14 and the second control grid being connected between the resistances 11 and 12.

The control voltage may, for instance, be taken from the amplified intermediate frequency voltage by rectifying this by means of a diode 15 and a condenser 16, this voltage is smoothed by means of a resistance 17 and a condenser 18. In the case under view the aforesaid potentiometer circuit is used at the same time for dividing the control voltage among the two control grids; to this end the control voltage is connected to a point between the resistances 12 and 13.

If desired, the control of the two control grids may also be carried out separately, for instance by means of two control diodes.

The two screen grids of the heptode are interconnected and the common screen-grid circuit comprises a resistance 19. The heptode 3 may, for instance, consist of the heptode portion of a triode-heptode.

Figure 2:
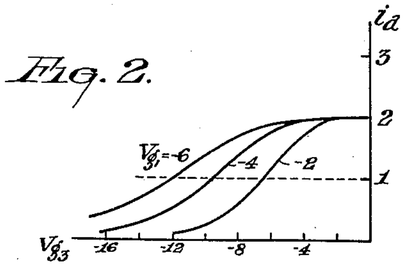

The operation of the circuit will now be explained by reference to the anode current-grid voltage characteristic voltages shown in Fig. 2. In this figure the value of the direct anode current ($i_a$) is plotted in milliamperes along the vertical axis, whereas the value of the negative direct voltage of the second control grid ($Vg_3$) is plotted in volts along the horizontal axis. The characteristic curves illustrate the relation existing between $i_a$ and $Vg_3$ for different values of the direct voltage of the first control grid ($Vg_1$), also expressed in volts. Each of these curves is linear over a sufficient area so that by a judicious choice of the working point distortion-free amplification is feasible. Furthermore the different curves exhibit a declining slope in a left-hand direction, so that in the case of an increase in control voltage, which involves a variation of both the direct voltage of the first and of the second control grid, the amplification of the circuit decreases. Since both the voltages on the first and second control grids ($Vg_1$ and $Vg_2$) vary with changes in the control voltage, a curve of $Vg_1$ vs. $Vg_3$ for various values of anode current is helpful in applying the curves shown in Fig. 2 to the circuits shown in Figs. 1 and 3. The aforementioned curve is constructed from data obtained from the curve shown in Fig. 2.

The control voltage is now preferably supplied to the control grids in such a proportion that in the case of adjustment the working point of the circuit shifts over the middles of the curves and so, for instance along the dotted line in the drawing. In this event it is also necessary, of course, that the control grids should be conveniently biased. When realising the control in the manner set out above the tube can be continuously controlled throughout the length of the characteristic curve without distortion.

When the anode and the screen grids derive their positive voltage from a high-tension supply unit it is often desirable to take care that any humming voltages set up at the screen grids are not further amplified. This can be ensured by interposing a series-connection (not represented in the drawing) of a resistance and a blocking condenser between the screen grid and the first control grid.

Figure 3:
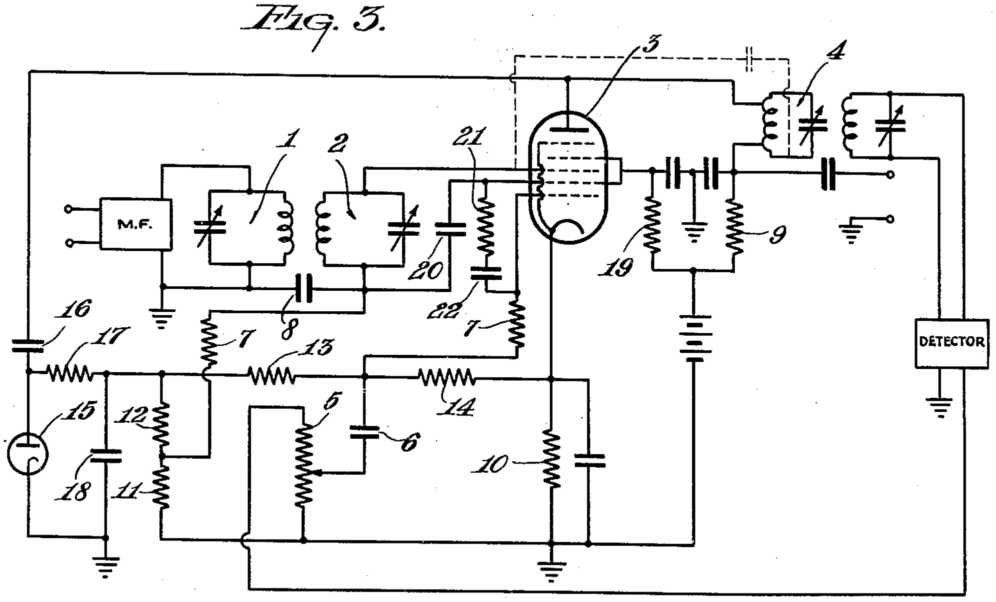

Fig. 3 represents another form of construction of the circuit according to the invention. This circuit is different from that shown in Fig. 1 in that the low frequency oscillations are supplied to the first control grid for the purpose of preliminary amplification and the amplified oscillations appearing in the screen-grid circuit are transmitted through a condenser 20 to the second control grid.

As a rule it is necessary, however, that the degree of preliminary amplification should be kept between definite limits to prevent self-oscillation of the circuit. Limitation of the preliminary amplification may take place in various ways, for instance by means of a potentiometer circuit or by making use of negative backcoupling.

The last-mentioned method is to be preferred and is illustrated in the circuit shown in Fig. 3; in this case a negative voltage backcoupling from the screen grid to the first control grid is obtained by means of a series-connection comprising a resistance 21 and a blocking condenser 22.

What I claim is:

1. A circuit arrangement for simultaneously amplifying signal voltages of frequencies occurring in different frequency bands, comprising an electron discharge tube having a cathode, a first control grid, a second control grid, a plurality of screen grids and an anode, means to interconnect said screen grids, means to combine a signal voltage of higher frequency with a signal voltage of lower frequency, means to apply said combined signal voltages to said second control grid, means to derive an amplified output voltage of said higher frequency, means to derive an amplified output voltage of said lower frequency, means to derive a direct potential proportional to the amplitude of said higher frequency signal voltage, means to produce a first control voltage and a second control voltage proportional to said potential, means to apply said first control voltage to said first control grid, and means to apply said second control voltage to said second control grid, said first control voltage and said second control voltage having values at which the operating point of said tube shifts over the central portions of the anode current-grid voltage characteristic curves whereby said amplified output voltages are linearly proportional to the respective signal voltages.

2. A circuit arrangement for simultaneously amplifying signal voltages of frequencies occurring in different frequency bands, comprising an electron discharge tube having a cathode, a first control grid, a first screen grid, a second control grid, a second screen grid and an anode, means to interconnect said screen grids, means to apply a signal voltage of lower frequency to one of said control grids, means to apply a signal voltage of higher frequency to the other of said control grids, means to derive an amplified voltage from said first screen grid, means to couple said second screen grid to said second control grid to apply said amplified voltage thereto, means to derive an amplified output voltage of said higher frequency, means to derive an amplified output voltage of said lower frequency, means to derive a direct potential proportional to the amplitude of said higher frequency signal voltage, means to produce a first control voltage and a second control voltage proportional to said potential, means to apply said first control voltage to said first control grid, and means to apply said second control voltage to said second control grid, said first control voltage and said second control voltage having values at which the operating point of said tube shifts over the central portions of the anode current-grid voltage characteristic curves whereby said amplified output voltages are linearly proportional to the respective signal voltages.

3. A circuit arrangement for simultaneously amplifying signal voltages of frequencies occurring in different frequency bands, comprising an electron discharge tube having a cathode, a first control grid, a first screen grid, a second control grid, a second screen grid and an anode, means to interconnect said screen grids, means to apply a signal voltage of lower frequency to said first control grid, means to apply a signal voltage of higher frequency to said second control grid, means to derive an amplified voltage of said lower frequency from said first screen grid, means to couple said second screen grid to said second control grid to apply said amplified voltage thereto, means to derive an amplified output voltage of said higher frequency, means to derive an amplified output voltage of said lower frequency, means to derive a direct potential proportional to the amplitude of said higher frequency signal voltage, means to produce a first control voltage and a second control voltage proportional to said potential, means to apply said first control voltage to said first control grid, and means to apply said second control voltage to said second control grid, said first control voltage and said second control voltage having values at which the operating point of said tube shifts over the central portions of the anode current-grid voltage characteristic curves whereby said amplified output voltages are linearly proportional to the respective signal voltages.

4. A circuit arrangement for simultaneously amplifying signal voltages of frequencies occurring in different frequency bands, comprising an electron discharge tube having a cathode, a first control grid, a first screen grid, a second control grid, a second screen grid and an anode, means to interconnect said screen grids, means to apply a signal voltage of lower frequency to one of said control grids, means to apply a signal voltage of higher frequency to one of said control grids, means to derive an amplified voltage of said lower frequency from said first screen grid, means to couple said second screen grid to said second control grid to apply said derived amplified voltage thereto, means coupled between said first control grid and said first screen grid to limit the amplitude of said derived amplified voltage, means to derive an amplified output voltage of said higher frequency, means to derive an amplified output voltage of said lower frequency, means to derive a direct potential proportional to the amplitude of said higher frequency signal voltage, means to produce a first control voltage and a second control voltage proportional to said potential, means to apply said first control voltage to said first control grid, and means to apply said second control voltage to said second control grid, said first control voltage and said second control voltage having values at which the operating point of said tube shifts over the central portions of the anode current-grid voltage characteristic curves whereby said amplified output voltages are linearly proportional to the respective signal voltages.

5. A circuit arrangement for simultaneously amplifying signal voltages of frequencies occurring in different frequency bands, comprising an electron discharge tube having a cathode, a first control grid, a first screen grid, a second control grid, a second screen grid and an anode, means to interconnect said screen grids, means to apply a signal voltage of lower frequency to said first control grid, means to apply a signal voltage of higher frequency to said second control grid, means to derive an amplified voltage of said lower frequency from said first screen grid, means to couple said second screen grid to said second control grid to apply said derived amplified voltage thereto, means coupled between said first control grid and said first screen grid to limit the amplitude of said derived amplified voltage, means to derive an amplified output voltage of said higher frequency, means to derive an amplified output voltage of said lower frequency, means to derive a direct potential proportional to the amplitude of said higher frequency signal voltage, means to produce a first control voltage and a second control voltage proportional to said potential, means to apply said first control voltage to said first control grid, and means to apply said second control voltage to said second control grid, said first control voltage and said second control voltage having values at which the operating point of said tube shifts over the central portions of the anode current-grid voltage characteristic curves whereby said amplified output voltages are linearly proportional to the respective signal voltages.

6. A circuit arrangement for simultaneously amplifying signal voltages of frequencies occurring in different frequency bands, comprising an electron discharge tube having a cathode, a first control grid, a first screen grid, a second control grid, a second screen grid and an anode, means to interconnect said screen grids, means to apply a signal voltage of lower frequency to said first control grid, means to apply a signal voltage of higher frequency to said second control grid, means to derive an amplified voltage of said lower frequency from said first screen grid, means to couple said second screen grid to said second control grid to apply said amplified voltage thereto, an impedance coupled between said first control grid and said first screen grid to prevent amplification of any alternating voltage appearing thereon, means to derive an amplified output voltage of said higher frequency, means to derive an amplified output voltage of said lower frequency, means to derive a direct potential proportional to the amplitude of said higher frequency signal voltage, means to produce a first control voltage and a second control voltage proportional to said potential, means to apply said first control voltage to said first control grid, and means to apply said second control voltage to said second control grid, said first control voltage and said second control voltage having values at which the operating point of said tube shifts over the central portions of the anode current-grid voltage characteristic curves whereby said amplified output voltages are linearly proportional to the respective signal voltages.

7. A circuit arrangement for simultaneously amplifying signal voltages of frequencies occurring in different frequency bands, comprising an electron discharge tube having a cathode, a first control grid, a first screen grid, a second control grid, a second screen grid and an anode, means to interconnect said screen grids, a screen resistor having one terminal thereof connected to said screen grids, means to combine a signal voltage of higher frequency with a signal voltage of lower frequency, means to apply said combined signal voltages to said second control grid, means comprising series connected output load impedances having one terminal thereof coupled to said anode to derive an amplified output voltage of said higher frequency and an amplified output voltage of said lower frequency, means to apply operating potentials to the remaining terminals of said screen resistor and said series connected load impedances, means comprising a bias resistor connected in the cathode circuit to develop a direct bias voltage, a voltage divider shunting said bias resistor and having a plurality of tappings thereon, means to couple the tappings of said voltage divider to said first and said second control grids to apply different values of bias voltage thereto, means to derive a direct potential proportional to the amplitude of said higher frequency signal voltage, means to produce a first control voltage and a second control voltage proportional to said potential, means to combine said first control voltage with the bias voltage applied to said first control grid, and means to combine said second control voltage with the bias voltage applied to said second control grid, said first control voltage and said second control voltage having values at which the operating point of said tube shifts over the central portions of the anode current-grid voltage characteristic curves whereby said amplified output voltages are linearly proportional to the respective signal voltages.

8. A circuit arrangement for simultaneously amplifying signal voltages of frequencies occurring in different frequency bands, comprising an electron discharge tube having a cathode, a first control grid, a first screen grid, a second control grid, a second screen grid and an anode, means to interconnect said screen grids, a screen resistor having one terminal thereof connected to said screen grids, means comprising series connected output load impedances having one terminal thereof coupled to said anode to derive an amplified output voltage of said higher frequency and an amplified output voltage of said lower frequency, means to apply operating potentials to the remaining terminals of said screen resistor and said series connected load impedances, means comprising a bias resistor connected in the cathode circuit to develop a direct bias potential, a voltage divider shunting said bias resistor and having a plurality of tappings thereon, means coupled to said voltage divider to combine a signal voltage of higher frequency with a signal voltage of lower frequency, means to couple the tappings of said voltage divider to said first and said second control grids to apply different values of bias voltage thereto and to apply said combined signal voltages to said second control grid, means to derive a direct potential proportional to the amplitude of said higher frequency signal voltage, means to produce a first control voltage and a second control voltage proportional to said potential, means to combine said first control voltage with the bias voltage applied to said first control grid, and means coupled to said voltage divider to combine said second control voltage with the bias voltage applied to said second control grid, said first control voltage and said second control voltage having values at which the operating point of said tube shifts over the central portions of the anode current-grid voltage characteristic curves whereby said amplified output voltages are linearly proportional to the respective signal voltages.

9. A circuit arrangement for simultaneously amplifying signal voltages of frequencies occurring in different frequency bands, comprising an electron discharge tube having a cathode, a first control grid, a first screen grid, a second control grid, a second screen grid and an anode, means to interconnect said screen grids, a screen resistor having one terminal thereof connected to said screen grids, means comprising series connected output load impedances having one terminal thereof coupled to said anode to derive an amplified output voltage of said higher frequency and an amplified output voltage of said lower frequency, means to apply operating potentials to the remaining terminals of said screen resistor and said series connected load impedances, means comprising a bias resistor connected in the cathode circuit to develop a direct bias potential, a voltage divider shunting said bias resistor and having a plurality of tappings thereon, means to couple the tappings of said voltage divider to said first and said second control grids to apply different values of bias voltage thereto, means coupled to said voltage divider to combine a signal voltage of higher frequency with the bias voltage applied to said second control grid and to combine a signal voltage of lower frequency with the bias voltage applied to said first control grid, means to couple said first screen grid to said second control grid, means to derive a direct potential proportional to the amplitude of said higher frequency signal voltage, means to produce a first control voltage and a second control voltage proportional to said potential, means to combine said first control voltage with the voltage applied to said first control grid, and means to combine said second control voltage with the voltage applied to said second control grid, said first control voltage and said second control voltage having values at which the operating point of said tube shifts over the central portions of the anode current-grid voltage characteristic curves whereby said amplified output voltages are linearly proportional to the respective signal voltages.

10. A circuit arrangement for simultaneously amplifying signal voltages of frequencies occurring in different frequency bands, comprising an electron discharge tube having a cathode, a first control grid, a first screen grid, a second control grid, a second screen grid and an anode, means to interconnect said screen grids, a screen resistor having one terminal thereof connected to said screen grids, means comprising series connected output load impedances having one terminal thereof coupled to said anode to derive an amplified output voltage of said higher frequency and an amplified output voltage of said lower frequency, means to apply operating potentials to the remaining terminals of said screen resistor and said series connected load impedances, means comprising a bias resistor connected in the cathode circuit to develop a direct bias potential, a voltage divider shunting said bias resistor and having a plurality of tappings thereon, means to couple the tappings of said voltage divider to said first and said second control grids to apply different values of bias voltage thereto, means coupled to said voltage divider to combine a signal voltage of higher frequency with the bias voltage applied to said second control grid and to combine a signal voltage of lower frequency with the bias voltage applied to said first control grid, a capacitor to couple said first screen grid to said second control grid, means to couple said first screen grid to said first control grid to limit the amplitude of the voltage applied to said second control grid by said capacitor, means to derive a direct potential proportional to the amplitude of said higher frequency signal voltage, means to produce a first control voltage and a second control voltage proportional to said potential, means to combine said first control voltage with the voltage applied to said first control grid, and means to combine said second control voltage with the voltage applied to said second control grid, said first control voltage and said second control voltage having values at which the operating point of said tube shifts over the central portions of the anode current-grid voltage characteristic curves whereby said amplified output voltages are linearly proportional to the respective signal voltages.

HENRICUS ADRIANUS BROOS.

REFERENCES CITED

The following references are of record in the file of this patent:

UNITED STATES PATENTS

| Number | Name | Date |
|---|---|---|
| 2,006,969 | Steimel et al. | July 2, 1935 |
| 2,058,512 | Rust et al. | Oct. 27, 1936 |
| 2,093,072 | Cooper | Sept. 14, 1937 |
| 2,201,365 | Case | May 21, 1940 |
| 2,234,691 | Dome | Mar. 11, 1941 |
| 2,315,042 | Boucke | Mar. 30, 1943 |